Sept. 22, 1925.
J. R. FLEMING
CAR AXLE BOX
Filed Feb. 9, 1921
1,554,627
2 Sheets-Sheet 1
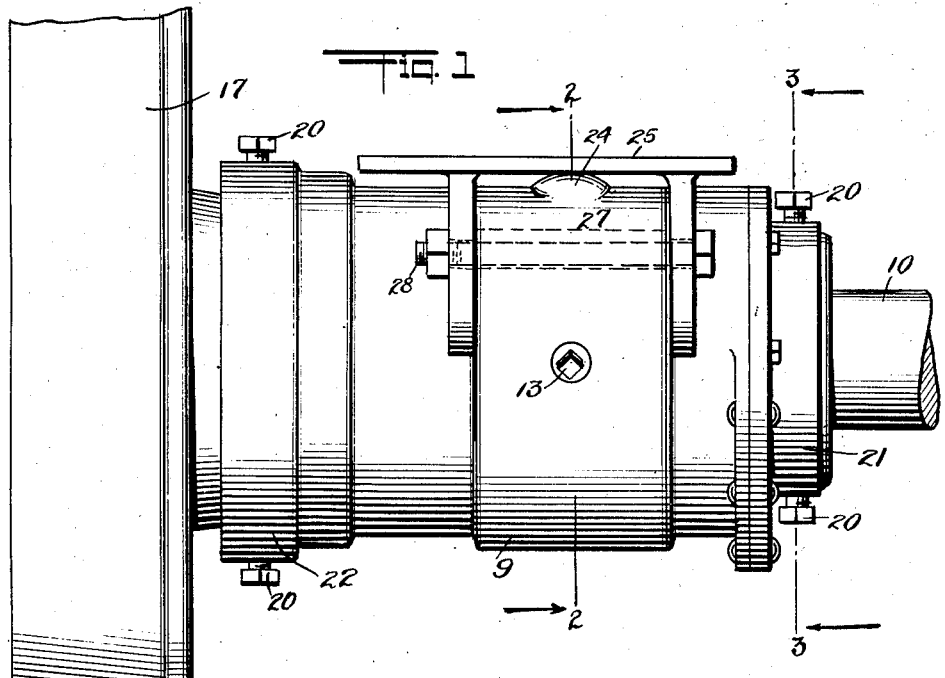
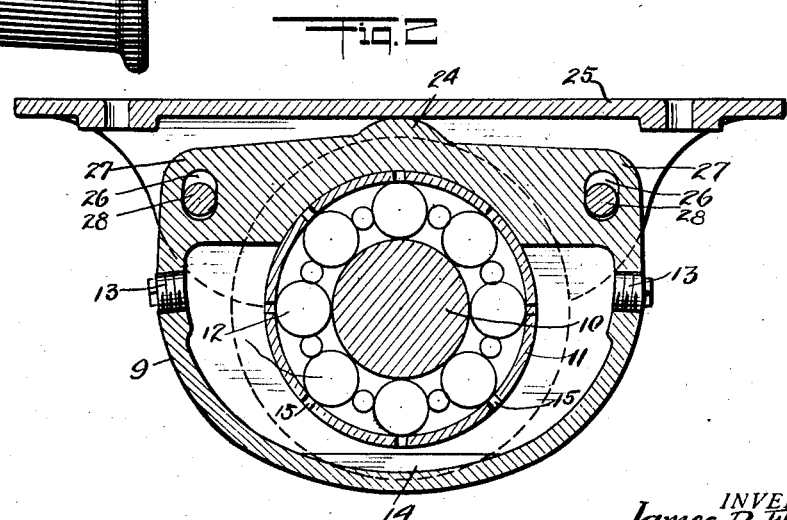
INVENTOR
James R. Fleming
BY
ATTORNEY
WITNESS
M. E. Lessin

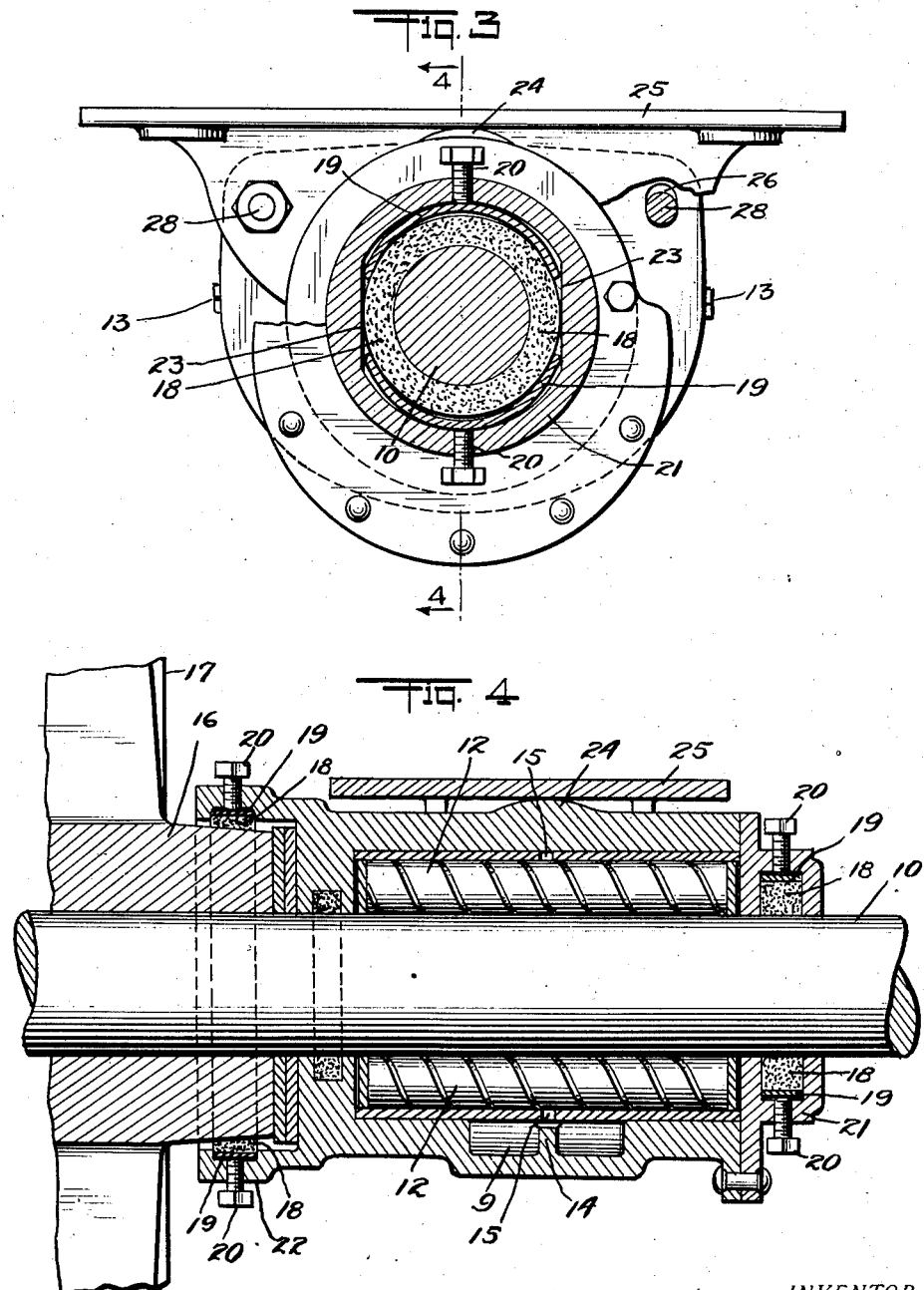

Patented Sept. 22, 1925.

1,554,627

UNITED STATES PATENT OFFICE.

JAMES R. FLEMING, OF SCRANTON, PENNSYLVANIA.

CAR-AXLE BOX.

Application filed February 9, 1921. Serial No. 443,497.

*To all whom it may concern:*

Be it known that I, JAMES R. FLEMING, a citizen of the United States, and a resident of Scranton, in the county of Lackawanna and State of Pennsylvania, have invented certain new and useful Improvements in a Car-Axle Box. of which the following is a full, clear, and exact description.

Among the principle objects which the present invention has in view are: To provide a reservoir for lubricant to be supplied to a roller bearing; to secure an automatic feed of lubricant to the said bearing; to facilitate the flow of lubricant to the bearing through the agency of the force of gravity; to prevent the lubricant from escaping from the journal box; to facilitate the introduction of lubricant for application to the bearing; and to provide means for compensating for the wear on the members for preventing the loss of lubricant from the journal box.

Figure 1 is a side view of a journal box, constructed and arranged in accordance with the present invention, and of fragments of the axle and wheel of a vehicle to which the box is applied.

Figure 2 is a cross section thereof, the section being taken on the line 2—2 in Fig. 1.

Figure 3 is a cross section, the section being taken on the line 3—3 in Fig. 1.

Figure 4 is a longitudinal section, the section being taken on the line 4—4, in Fig. 3.

The present invention relates particularly to improvements in journal boxes used in conjunction with the running gear of cars employed in mines such as coal mines where the tracks are temporarily laid and where the cars are tilted for dumping sometimes lengthwise as in the anthracite coal mines, and sometimes sidewise as is the usual custom in the bituminous coal mines. A difficulty has arisen in the past practice of lubrication from the fact that the way the cars are tilted, and especially when the cars are tilted to the side, the lubricant with which the journal box has been supplied finds its way out along the axle or the hub of the wheel, if the wheel be what is known as an outside wheel, and is thereby lost. The introduction of roller bearings in the construction of cars of the character mentioned has accentuated the difficulties under which the lubrication of the bearings has been performed. A larger box than formerly employed has become a requisite to the construction, and a means for providing a constant but small supply of lubricant to the bearings has been a long-felt want.

In the present invention the lubricant is preferably a light grease which is packed within the lubricating chamber 9 at both sides of the car axle 10 and of the casing 11 for the bearing rollers 12. To introduce the lubricant to the chamber 9, the screw plugs 13 are first removed and the lubricant is then forced into the said chamber by means of a squirt-gun or other lubricating device, until the said chamber is packed. The screw plugs 13 are then re-installed as shown best in Fig. 2 of the drawings. The chamber 9 has across the lower portion thereof, a low partition 14, the upper surface of which is relatively broad and operates as a packer for forcing the lubricant through the holes 15 in the casing 11 as the same travels over the said partition. The partition also serves to restrain the lubricant from surging lengthwise of the chamber at the lower portion thereof where any heat generated in the bearing would liquefy the grease or lubricant.

As seen best in Fig. 2 of the drawings the casing 11 has a series of perforations or holes 15 through which the lubricant may pass to the interior of the said casing. In practice, the casing 11 forms the race on which the rollers 12 roll. A slight drag incident to the construction causes the casing 11 to rotate about the center of the axle 10. The rotation of the said casing presents each and all of the holes 15 to the lubricant in the chamber 9 and carries the same above the flat upper edge of the partition 14.

As the rollers 12 roll against the interior of the casing 11, the lubricant which is introduced through the holes 15 is picked up by the said rollers as they pass and spread on the inner surface of the casing 11, and the surface of the axle 10. The holes 15 are disposed in the longitudinal center of the casing 11 so that all lubricant entering said casing enters at the center thereof.

When using rollers such as shown in Fig. 4 of the drawings where spiral grooves are provided, the grooves operate to move the lubricant from the center of the casing 11 to the ends thereof. With this and other purposes in view, the rollers are constructed with right and left pitch, that is the grooves of each roller are opposite in pitch to those of the adjacent rollers. The result of this is that one roller moves the lubricant toward one end of the bearing casing, while the other roller moves the lubricant toward the opposite end of the casing.

It will be understood that if the lubricant is of the proper consistency, the weight of the lubricant in the upper portions of the chamber 9 will be sufficient to introduce a small, but sufficient amount of lubricant to the interior of the casing 11, and through the holes 15 provided therein. It is also obvious that as the bearing is operated under load carrying conditions, the parts become more or less heated with the result that the lubricant is made more or less thin whereby it readily flows. Under such conditions when the car is upturned, the lubricant tends to flow through the box and the bearings along the axle 10 and the hub 16 of the wheel 17. To prevent this there are provided in the present invention soft packing rings 18. The packing 18 is of any suitable material such as felt or waste, and is held firmly against the axle 10 by flat pieces of metal shaped to provide curved segments 19. The segments 19 as seen best in Fig. 3 of the drawings are moved vertically by set screws 20. To contract the extremities of the segments, the inner surface of the walls of the packing collars 21 and 22 have straight vertical portions 23 which approach the axle 10 as shown. The extremities of the segments 19 bear on the surface of the vertical portions 23 with the result that they are contracted to conform to a sharper curve or circle of smaller diameter, as the segments 19 are moved toward the axle 10 by the screws 20.

By operating the screws 20 from time to time, to cause the packing 18 to close on the axle 10, all wear of the said packing is compensated for, and by this means the lubricant above referred to is prevented from escaping from the journal box.

To avoid unequal wear of the rollers 12 on the axle 10, I provide the box with a spherical bearing pad 24, the apex of which is coincident with the central line between the ends of the rollers 12. The pad 24 has a universal rocking bearing on the chair plate 25 which is bolted to the sill or side member of the construction. To provide the journal box with freedom of movement so that it may adjust itself on the said plate, the bolt holes 26 in the ridge 27 are vertically elongated so that the bolts 28 may rest therein to prevent the box from moving lengthwise of the car while permitting the box to rock endwise or sidewise on the pad 24. The ridge 27 forms a heavy reinforcement for the journal box and for the upper or weight-bearing portion thereof. The reinforcing ridge is placed in line with the pad 24, whereon the weight is primarily imparted to the journal box. A peculiarly strong structure is formed thereby.

Claims:

1. The combination of a roller bearing having a cylindrical casing provided with an annular series of perforations disposed on the median transverse plane or said casing; a plurality of spirally grooved rollers mounted in said casing, the pitch of the grooves in certain of the said rollers being disposed at a pitch opposite the pitch of certain other of said rollers; a journal box having a bearing portion for said casing; and a reservoir for lubricant, said reservoir extending laterally from said bearing portion and converging toward said casing for close juxtaposition thereto at the lower extremity thereof; a partition for said reservoir in line with the perforations in said casing, a partition wall dividing the bottom of said reservoir into spaced lubricant directing portions, the upper edge of said partition being adapted to retain heavy lubricant, whereby the same is forced through the said perforations in correspondence with the rotation of said casing by said rollers.

2. The combination of a roller bearing having a cylindrical casing provided with an annular series of perforations disposed on the median transverse plane of said casing, a plurality of spirally grooved rollers mounted in said casing, a journal box having a bearing portion for the journalling therein of said casing, and a reservoir for lubricant, said reservoir being formed in said casing and extending laterally from said bearing portion and converging towards said casing for close juxtaposition thereto at the lower extremity thereof, the bottom of said reservoir having grooves therein disposed in line with the perforations in said casing, the upper edge of the partition wall between said latter grooves being adapted to retain a heavy lubricant, whereby the same is forced through the perforations in said casing in correspondence with the rotation of said casing by said rollers.

3. In an anti-friction bearing for axles and the like, a series of rollers surrounding an axle, a rotatable casing surrounding and enclosing said rollers, a housing for said casing and rollers, a lubricant reservoir in said housing beneath said casing, a rib in said reservoir disposed in close relation to the surface of said casing, said casing being perforated in alignment with said rib whereby lubricant will be forced into the perforations of said casing.

JAMES R. FLEMING.